United States Patent Office 3,008,375
Patented Nov. 14, 1961

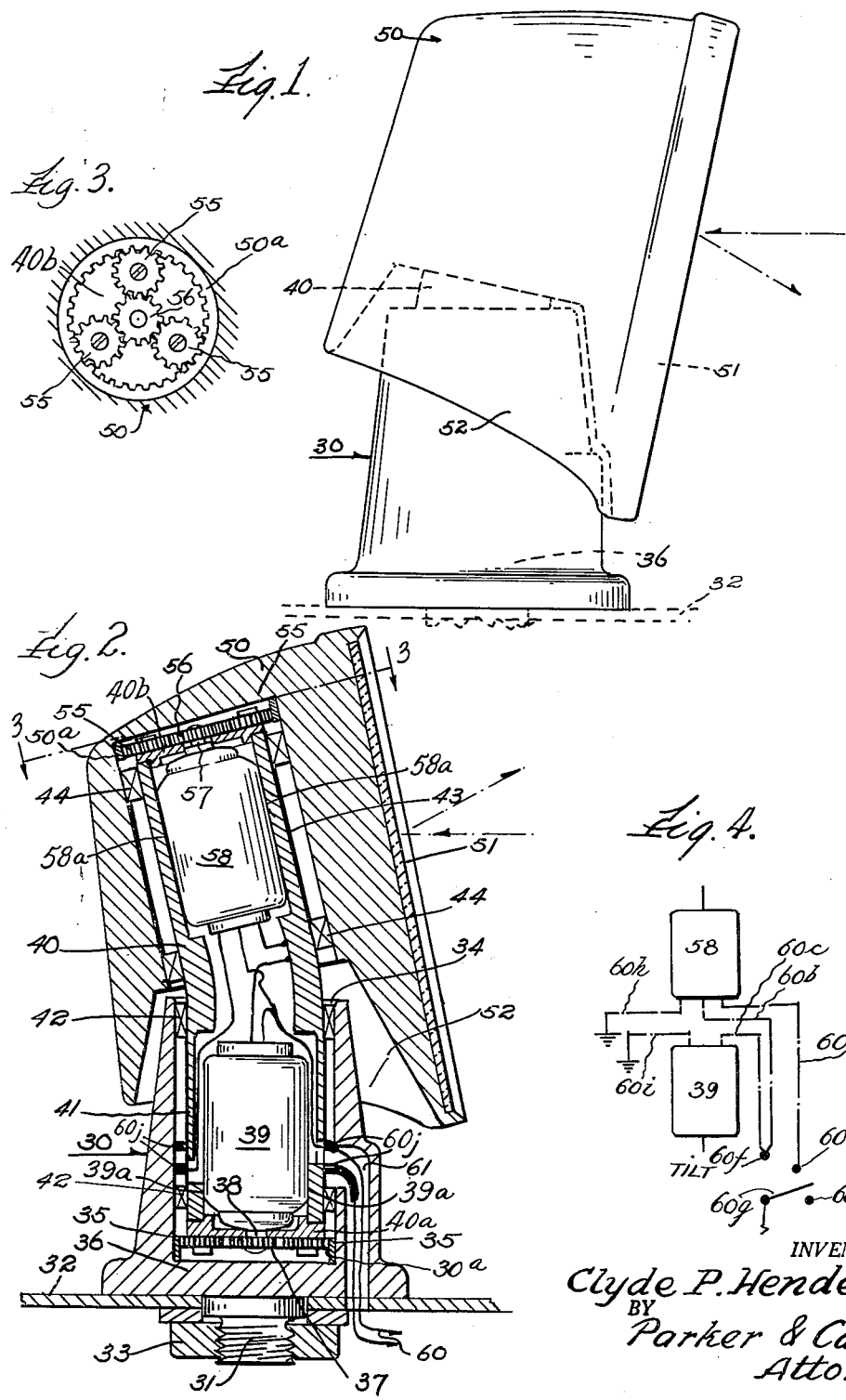

3,008,375
POWER ACTUATED REAR VIEW MIRROR
Clyde P. Henderson, Hinsdale, Ill.
(2808 N. Orange Ave., Orlando, Fla.)
Filed June 18, 1957, Ser. No. 666,334
3 Claims. (Cl. 88—98)

This invention relates to rear view mirrors for automobiles and the like and has for one purpose to provide a remote-control mirror.

Another purpose is to provide a rear view mirror positionable from the inside of the vehicle by the operator thereof.

Another purpose is to provide a power-actuated rear view mirror having actuating mechanism contained within a housing supporting the mirror.

Another purpose is to provide a rear view mirror movable in at least two planes.

Another purpose is to provide a power-actuated rear view mirror for vehicles and the like.

Another purpose is to provide a rear view mirror structure in which a mirror surface may be tilted about a horizontal axis.

Another purpose is to provide a rear view mirror which may be actuated from within a vehicle without the employment of linkage at any time.

Another purpose is to provide a rear view mirror which may be rotated and tilted and in which the mechanism is at all times actuated and rotated simultaneously with the tilting mechanism.

Another purpose is to provide a rear view mirror positionable by the operator from a remote point wherein the mirror may be rotated independently of the tilting thereof.

Other purposes will appear from time to time during the course of the specification and claims.

I illustrate my invention more or less diagrammatically in the accompanying drawings, wherein:

FIGURE 1 is a side elevation;
FIGURE 2 is a side view in partial cross-section, illustrating the device of FIGURE 1 in another position.
FIGURE 3 is a detail view on the line 3—3 of FIGURE 2.
FIGURE 4 is a detail view illustrating an electrical circuit employable with my invention.

Referring now to FIGURES 1 and 2, the numeral 30 generally indicates a support housing which may be secured to a vehicle, for example, by means of a threaded portion 31 extending through a vehicle part 32 and secured thereto by any suitable connectors such as that illustrated at 33. The support housing 30 may be hollow and upwardly open as at 34.

A number of planetary gears or toothed elements, for example, three, such as those indicated at 35, may be supported, as appears further hereinbelow, adjacent a bottom wall 36 of the housing 30. A driven gear 37 may be in mesh with the members 35 and may be secured to a shaft 38 of a motor 39. An internally toothed ring gear 30a may be secured within and to the housing 30 and have its teeth in mesh with those of the members 35.

Rotatably supported within the housing 30 is a shaft element 40. The shaft 40 may be hollow and may have a vertical lower portion 41 rotatably mounted within the support 30, the numeral 42 indicating suitable bearing elements effective for this purpose. The member 40 has an inclined upper portion 43 and extends upwardly through the open upper end of the support 30. A cap 40a substantially closes the lower open end of hollow shaft 40 and rotatably carries the planetary gears 35, as above described. The motor 39 is fixedly secured within and to the hollow shaft 40, as may be best seen at 39a.

Rotatably supported on the shaft portion 43, as by the bearing elements 44, is a mirror housing 50. The housing 50 has a mirror surface 51 which may be circular, octagonal or in any suitable planar or concave form. The housing 50 surrounds the shaft portion 43 and has a depending skirt portion 52 surrounding and masking the upper portion of the support housing 30.

Rotatably carried by a second cap 40b substantially closing the opposite end of hollow shaft 40 and at a point adjacent the inner upper walls of the housing 50 are a number of planetary gears or toothed members, such as the three members 55. A driven gear 56 is in mesh with the gears 55 and is secured to the shaft 57 of a reversible-direction motor 58 mounted within and secured to the shaft portion 43 as indicated at 58a. An internally toothed ring gear 50a is secured to and within the housing 50 and has its teeth in mesh with those of the members 55.

Suitable conductor elements 60 extend through a passage 61 formed in the housing 30 for that purpose and are connected to the motors 39, 58 as by contact or slip rings indicated generally at 60j, to provide actuation thereof. It will be understood that conductors 60 are suitably connected to a source of electrical energy and to an appropriate switch element available to the vehicle operator.

Referring now to FIGURE 4, it will be noted that the conductors indicated generally by the numeral 60 in FIGURE 2 may comprise a first conduit 60a extending from a switch contact 60e to the motor 58. A pair of connectors 60b, 60c extend from a switch contact 60f to the motor 58, 39, respectively. A pair of ground connectors 60h, 60i extend from the motor 58, 39 respectively. An off contact for the switch 60g is indicated at 60d.

Whereas I have described and claimed a practical and operative device, nevertheless, many changes may be made in the size, shape, number and disposition of parts without departing from the spirit of my invention. I therefore wish my description and drawings to be taken as in a broad sense illustrative or diagrammatic, rather than as limiting me to my precise showing.

The use and operation of my invention are as follows:
Referring to FIGURES 1 and 2, it will be understood that the vehicle operator, by actuation of an appropriate switch member, is enabled to rotate the mirror housing 50 illustrated in FIGURES 1 and 2 about a vertical axis in response to actuation of the motor 58 secured to the shaft 40. Similarly, in response to actuation of the motor 39, rotation of the shaft 40 produces a tilting of the housing 50 when the inclined shaft portion 43 is rotated out of the position, for example, illustrated in FIGURE 2. FIGURE 1 illustrates the device when the shaft 40 has been rotated 180° from the position illustrated in FIGURE 2 thus producing a forward tilt of the mirror surface 51. Thus the vehicle operator is enabled to position the mirror surface 51 of the structure illustrated in FIGURES 1 and 2 to effectively provide for viewing of the selected area rearwardly of the vehicle whatever the height of the line of vision of the operator and whatever the position occupied by the operator relative to the centerline of the vehicle.

As may be best seen in FIGURES 2 and 4, the operator rotates the mirror housing 50 by placing the switch 60g at the contact 60e, thus rotating the motor 58 and shaft 57 to rotate the housing 50 in one direction until it reaches the desired position. When the operator desires to adjust the tilt or angle of the mirror housing 50, the switch 60g is moved to the contact 60f. The motor 58 and 39 are thereupon both energized, the motor 39 being effective to rotate the shafts 40 in one rotational direction, the motor 58 being energized to rotate the housing 50 simultaneously in the opposite direction, the adjustment of motor speeds being such as to cause the mirror housing 50 to retain its position in relation to the housing 30 while being tilted in response to movement of the inclined shaft portion 43.

It will be observed that motor 39 cannot be energized to cause rotation of shaft 40 without simultaneous energizing of motor 58 to insure maintenance of position of the mirror housing 50.

I claim:

1. In a power-actuated rear-view mirror, in combination, a hollow mirror support open at the top, a hollow shaft rotatably mounted in said support and extending through said open top, said shaft having a portion outside said support and inclined from the vertical axis of said support, a uni-directional motor secured to said shaft and having a driving connection with said housing effective to rotate said shaft about said axis, a mirror housing rotatably supported on said inclined shaft portion and a reversible-direction motor secured to said shaft and having a driving connection with said mirror housing effective to rotate said mirror housing about said inclined portion.

2. In a power actuated rear view mirror, a support, a hollow shaft rotatably mounted in said support and extending outwardly therefrom, said shaft having an inclined portion outside said support, a motor secured to said shaft and having a driving connection with said support effective to produce rotation of said shaft on said support in response to actuation of said motor, a mirror housing rotatably supported on said inclined shaft portion, a second motor secured to said shaft and having a driving connection with said mirror housing effective to rotate said mirror housing about said shaft inclined portion and an electrical connection to said motors effective to produce simultaneous actuation of said motors in opposite directions.

3. In a power actuated rear view mirror, a support, a hollow shaft rotatably mounted in said support and extending outwardly therefrom, said shaft having an inclined portion outside said support, a motor secured to said shaft and having a driving connection with said support effective to produce rotation of said shaft on said support in response to actuation of said motor, a mirror housing rotatably supported on said inclined shaft portion, a second motor secured to said shaft and having a driving connection with said mirror housing effective to rotate said mirror housing about said shaft inclined portion and an electrical connection to said motors effective to produce simultaneous actuation of said motors in opposite directions, said electrical connection including a connection effective to cause actuation of said second motor only.

References Cited in the file of this patent

UNITED STATES PATENTS

| | | |
|---|---|---|
| 1,641,167 | Hannig | Sept. 6, 1927 |
| 1,913,874 | Folberth et al. | June 13, 1933 |
| 1,987,457 | Anchors | Jan. 8, 1935 |
| 2,126,059 | Turner | Aug. 9, 1938 |
| 2,567,324 | Davis | Sept. 11, 1951 |
| 2,573,127 | Von Bredow | Oct. 30, 1951 |
| 2,656,764 | Johnson | Oct. 27, 1953 |
| 2,713,810 | Hill | July 26, 1955 |
| 2,718,175 | Gim | Sept. 20, 1955 |
| 2,737,852 | Porter et al. | Mar. 13, 1956 |
| 2,877,686 | Foster | Mar. 17, 1959 |